United States Patent [19]

Wong

[11] 4,032,978
[45] June 28, 1977

[54] PSEUDO HALFTONE PRINT GENERATOR AND METHOD

[75] Inventor: Kwan Y. Wong, San Jose, Calif.

[73] Assignee: International Business Machines Corporation, Armonk, N.Y.

[22] Filed: Jan. 20, 1975

[21] Appl. No.: 542,530

[52] U.S. Cl. .............................. 358/283; 358/298
[51] Int. Cl.² ...................... H04N 1/40; H04N 1/22
[58] Field of Search ............ 178/5, 6, 6.6 R, 6.6 A, 178/6.6 B, 6.7 R, 6.7 A

[56] References Cited

UNITED STATES PATENTS

| | | | |
|---|---|---|---|
| 3,294,896 | 12/1966 | Young | 178/5 |
| 3,916,096 | 10/1975 | Everett | 178/6.6 R |

OTHER PUBLICATIONS

Smith, Halftone Image Produced by Pseudo-Random Bit Generator, IBM Tech. Disclosure Bulletin, vol. 17, No. 7, 12/74.

*Primary Examiner*—Raymond F. Cardillo, Jr.
*Attorney, Agent, or Firm*—J. H. Holcombe; O. Schmid, Jr.

[57] ABSTRACT

Gray scale levels are converted to pseudo halftone print by a pseudo halftone generator which reduces Moire effects. The generator includes a comparator and an incrementing cyclic counting mechanism to compare the gray scale level to the cyclicly generated reference count for each print position in a print line to generate a print signal upon the level being greater than the count. The cyclicly generated count is incremented by a preselected number N for each print position and recycles at the square of that number ($N^2$). The square value may also be selected as the maximum level of the gray scale range. N adjacent print lines may be grouped together to form a series of (N×N) matrices. The reference or lowest count value for each of the lines in a matrix is different and they range from zero to N-1. The arrangement of the lines in the matrix is such as to minimize the difference between the sums of the count element values for any two adjacent print lines. The count for each generator is initialized at the beginning of the print line and may be established randomly for each print line or, alternatively, for each matrix of print lines, the matrix being arranged in a predetermined manner.

14 Claims, 12 Drawing Figures

FIG. 11

PSEUDO HALFTONE PRINT GENERATOR AND METHOD

BACKGROUND OF THE INVENTION

In the graphic arts industry, which ranges from the publication of newspapers, books, and magazines to computer output printers, the printing process commonly used is an all or nothing binary process. This all or nothing process comprises depositing a dot of ink on paper wherever it is desired to print and to deposit no ink where the absence of an image is desired. This all or nothing process is acceptable and in fact desirable when alphanumeric characters or other symbols are printed. A problem arises, however, when images employing gray scales or light gradations in continuous tones are to be printed, such as in the printing of photographs. This problem is commonly solved by transforming the continuous tone of the original image into halftone or pseudo halftone images. Halftone images typically comprise a large number of ink dots of various sizes. The size of the ink dots correspond to the shades or tones to be reproduced. When the dots in the corresponding spaces on the paper between the dots are small compared to the visual acuity of the human eye, they are subliminal to the eye and not recognized. The dots and the spaces on the paper thus fuse visually and trick the eye into believing that various shades of continuous tones are seen. Pseudo halftone images refers to the process of reproducing the continuous tone images or gray scale with a printing device having a fixed printed spot size and fixed spot-to-sport spacing. The level of gray to be reproduced thus is represented by a number of dots which are printed out of a specified line segment or matrix array of printing positions. If the individual sports are sufficiently small, they effect a merger insofar as the eye is concerned to form a visual merger with the spaces between the dots to cause the eye to believe it is seeing various shades of continuous tones.

Electronics have been applied to image printing at various times with respect to the creation of half tone or pseudo half tone images. One example is Richard G. Sweet et al U.S. Pat. No. 3,373,437, entitled "Fluid Droplet Recorder with a Plurality of Jets." This patent illustrates an ink jet printing mechanism wherein jets of ink are each caused to break into a uniform stream of droplets which are directed to impact the paper which is to be printed. Selected droplets which are not to be printed are charged as they break from the stream and are deflected by a constant electrostatic field to impact a gutter. A video intelligence signal representing the relative brightness or inverse gray scale of the image to be reproduced is sampled and applied to the charging electrode into a R-C time constant circuit. The sampled pulse thus decays at a rate determined by the R-C time constant. So long as the charging electrode stays above a predetermined threshold value, the droplets emanating from the jet are charged and deflected to the gutter, leaving the paper unmarked. Upon the signal dropping below the threshold value, the remaining drops of the stream are uncharged and impact the paper. The ratio of drops impacting the paper with respect to the total number of drops produced prior to application of the next video signal comprises the gray scale level of the sampled video signal. In a printing line made up of a string of ink droplets or their unprinted positions, the droplets would thus be grouped periodically in accordance with the periods of the video signal, the droplets appearing towards the end of each period and the spaces at the beginning of each period.

Another example is shown in IBM Technical Disclosure Bulletin, "Pseudo Half Tone for Representing Continuous Tone Images in Black-White Facsimile Systems," G. K. Machol, Vol. 9, No. 6, Nov. 1966, pages 636-637. This example illustrates the derivation of pseudo half tone matrices in accordance with a predetermined logic. The analog video signal is applied to a quantizer which samples the video signal and provides a binary coded output indicating the gray scale level of the sample point. The logic circuit then transforms the binary coded values into a white zero or black one for each print position of the matrix. Also shown is the incorporation of an alternating bit in the logic to allow estimation of an eight-level quantization by a four bit matrix through the incorporation of an extra black dot in every other matrix. In U.S. Pat. No. 3,604,846, David Behane et al, entitled "Method and System for Reconstruction of Half-Tone Images," the matrix patterns are placed in a table in storage and are accessed in accordance with a quantized video density value.

The difficulty with the dot bunching arrangement of Sweet et al is that it generates pronounced moire patterns in any larger area of the same or similar gray scale levels. Judicious choice of the matrices of Machol or of Behane et al may reduce but do not eliminate the Moire patterns. They, however, introduce the requirement for complex logic circuitry or for an extensive storage and accessing mechanism to transform the quantized gray level into the proper form.

Purely random dot generation for halftones has been known for some time and a specific arrangement is shown in IBM Technical Disclosure Bulletin, "Halftone Image Produced by Pseudo-Random Bit Generator," G. L. Smith, Vol. 17, No. 7, Dec. 1974, pages 1858-1859. A high frequency pseudo-random bit generator partially enables various AND circuits which are also partially enabled by the gray scale level inputs so that a binary print output signal is more probable with higher gray scale levels. Being purely random, the system may convert at times the wrong gray scale. The circuitry requires the gray scale input to cover a large scanned area and the system lacks high resolution capability for black and white printing.

SUMMARY OF THE INVENTION

It is therefore an object of the present invention to employ a simplified arrangement to generate pseudo halftone images which reduces Moire pattern effects.

Another object of the present invention is to provide an even distribution of spots for a given gray scale level such that the resultant image may be scanned and reproduced without significant variation.

According to the present invention, a pseudo halftone generator is initialized at the beginning of each line of printing in accordance with a random number generator. The pseudo halftone generator is arranged to count cyclicly from the initialized count, incrementing the count by a preselected number N for each print position and recycling when the number of counts equals or exceeds the square of that number. For each print position, the count is compared to the gray scale level input to generate a print signal upon the level being greater than the count. Further in accordance with the present invention, an adjacent group of print lines may be arranged in a preselected matrix format of dimension N controlled by the initialization so that the lowest or reference count value for each line in the matrix is different and is shifted from the lowest count value of the preceding line in the matrix by the number of print positions equal to an integer close to the square root of N.

A feature of the present invention is that it is operable with the presentation of gray scale levels at a different frequency than the recycling frequency of the pseudo halftone generator.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 11 is a diagrammatic representation of a series of various size gray scale matrices and showing the low count value print position for each line in accordance with the invention.

DETAILED DESCRIPTION OF THE INVENTION

Figures 1, 2, 3:
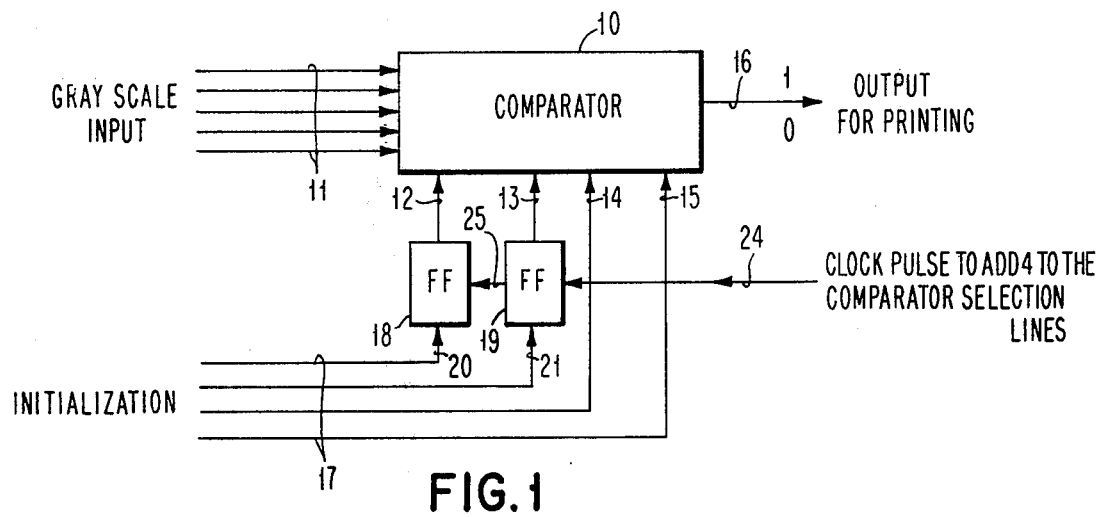
FIG. 1 is a block diagram of a pseudo halftone generator constructed in accordance with the invention.
FIG. 2 is a diagrammatic representation of gray scale matrices.
FIG. 3 is a diagrammatic representation of the matrices of FIG. 2 with the appropriate dot patterns.

Pseudo halftone as discussed herein refers to the process of reproducing continuous tone images or gray scales with a printing device having only two levels of gray, namely, black and white, and operating with a fixed printed spot size and fixed spot-to-spot spacing. An embodiment of the pseudo halftone generator of the present invention is illustrated in FIG. 1. In the example shown, the quantized, binary coded gray scale level is supplied to digital comparator 10 on lines 11. A cyclicly generated binary coded count is supplied to the comparator 10 on lines 12 through 15. Such digital comparators are well known in the art and may be arranged to provide an output on line 16 when the digital value on lines 11 exceeds that of lines 12–15. Thus, whenever the gray scale input level exceeds the count appearing on lines 12–15, comparator 10 supplies an output signal on line 16 to operate the printing mechanism to print a dot in the corresponding print position. At the beginning of a print line, an initialization count is supplied on line 17. The initialization count may be achieved by random number generation or in a predetermined manner, both of which will be discussed hereinafter. The signals on line 17 are applied to flip-flops 18 and 19 to input lines 14 and 15 of comparator 10. The flip-flops 18 and 19 are selectively set or reset in accordance with the signal appearing at the inputs 20 and 21 thereof. The resultant output signals, if any, are supplied on lines 12 and 13 to comparator 10. For example, a positive signal appearing on any one of the lines may represent the presence of a binary bit, whereas a negative signal on any one of the lines may represent the absence of a binary bit. For each print position in a printing line of the printing apparatus, a pulse is supplied on line 24. The pulse causes flip-flop 19 to reverse its condition, for example, changing from the state of supplying a binary 1 on line 13 to the state of supplying a 0 on line 13. When switching from the 1 to the 0 state, flip-flop 19 further supplies a carry output pulse on line 25 to flip-flop 18. The occurrence of a pulse on line 25 similarly causes flip-flop 18 to reverse state. Thus, the net effect of a pulse appearing on line 24 is to add the binary equivalent of 4 to the count appearing at the input lines 12–15 to comparator 10. Thus, N is equal to 4. In the example shown, the count appearing on lines 12–15 to comparator 10 may range from a low of 0 to a high value, represented by all ones, of 15. Inasmuch as no carry output is supplied from flip-flop 18 to a higher order input to comparator 10, the effect of a pulse on line 24 when both flip-flops 18 and 19 are in the 1 state is to reverse both flip-flops to the 0 state. This has the effect of recycling to or through 0 the count value appearing at input 12–15 upon that value exceeding a value of 15. For example, if the count represented by lines 12 through 15 were a binary 14 (1110), the appearance of a pulse on line 24 will operate both flip-flops 18 and 19 to the opposite state so that the resultant count appearing on lines 12–15 is the binary equivalent of 2 (0010). The count supplied on lines 12–15 can thus be set to be incremented by a selected number of 4 and to recycle at the count of 15, which value is the square of the preselected incrementation number N minus 1.

The exemplary gray scale range represented by lines 11 supplied to comparator 10 is from a level of zero (all white) to 16 (all black). Five lines are therefore required to indicate the highest gray scale level of 16, which takes the form 10000. If it is desired to employ only 16 gray scale levels from 0 to 15, a logic circuit may be added to automatically convert the 15 level (1111) to the 16 level (10000).

Referring to FIG. 2, some print line matrices are illustrated. That of FIG. 2A corresponds to a realized pattern produced by the circuitry of FIG. 1 wherein each print line is one of the rows of the FIG. With respect to row 30, the circuitry would be initialized with a count of 0 and incremented by four for each subsequent print position. recycling to 0 rather than counting 16. Row 31 would be initialized at a count of 11 and similarly incremented by four for each print position. Row 32 is seen initialized with a count of 1 and also incremented by four for each print position. Lastly, row 33 is initialized with a count of 10 and similarly incremented. The number in each print position of the matrices thus indicates the gray scale level which must be exceeded in order for a dot to be printed at that print position. The pattern illustrated in the matrices of FIG. 2B is different and is simply sequential in nature and is not arranged to be produced by circuitry resembling that of FIG. 1.

FIG. 3 illustrates exemplary dot patterns resulting from the same gray level input as printed in accordance with the matrices shown in FIG. 2. In the dot pattern of FIG. 3A, the gray level value of 4 supplied at input lines 11 to comparator 10 causes the comparator to provide an output at print position 0, but exceeds the count supplied on lines 12–15 in no other position on line 30. Similarly, the gray scale level of 4 exceeds only the count of 3 in line 31, exceeds only the supplied count of 1 in line 32 and exceeds only the count of 2 in line 33. The net effect of the apparatus of FIG. 1 is to scatter the dots throughout the matrix and thus avoid bunching and a tendency to create Moire patterns.

The arrangement of print position gray scale levels shown in FIG. 2B is not in accordance with the present invention and results in dot patterns as shown in FIG. 3B. This dot pattern in essence alters the gray level to a combination of a black line and white space. Other gray scale levels applied to the matrix of FIG. 2B similarly result in dot patterns having bunching of the dots and in the creation of Moire patterns.

Figure 4:
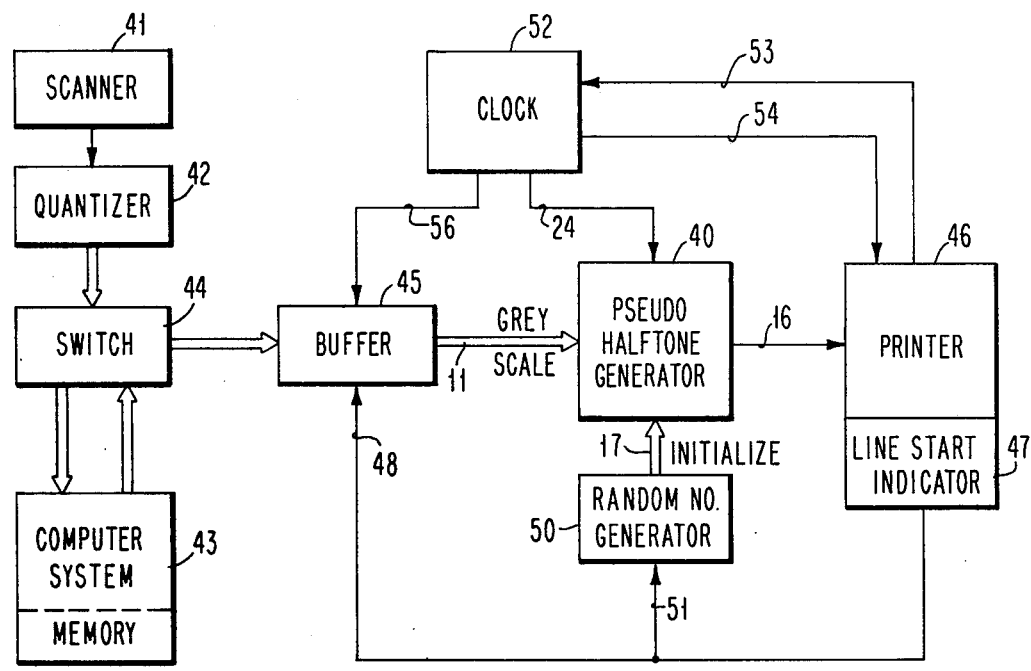
FIG. 4 is a schematic block diagram of a scanning and printing system employing the pseudo halftone generator of FIG. 1.

Referring to FIG. 4, a system is illustrated which employs the pseudo halftone generator 40 shown in detail in FIG. 1. The pseudo halftone generator may be employed to convert gray scale levels for printing either from the output of a scanner 41 as quantized by quantizer 42 or from a computer system 43. A switch 44 may selectively supply the data from the scanner and quantizer or from the computer system to a buffer 45. The switch 44 may alternatively supply the quantized data from quantizer 42 to the computer system 43 for storage in the memory thereof. The computer system may then selectively transmit the quantized gray scale information from the memory to the buffer 45. Buffer 45 is required because the data transmission characteristics of the quantizer 42 or of the computer system 43 may not be identical to that of the pseudo halftone generator 40. The gray scale data is supplied by buffer 45 on lines 11 to the pseudo halftone generator 40. The output of the generator is supplied on line 16 to a printer 46. The printer 46 may comprise an ink jet printer, a cathode ray microfilm printer, a wire printer or even an impact printer or typewriter printer fitted with special spot printing elements. All such printers have a mechanism such as line start indicator 47 to indicate the termination of printing of one line and the beginning of printing of another line. The line start indicator 47 is connected to buffer 45 via line 48 and to a random number generator 50 via line 51. Random number generators normally comprise a recycling counting mechanism such as a binary counter which is stepped or sequenced by noise signals exceeding threshold levels and are unclocked. Thus, the number generated is random as compared to any of the machine cycles or clocking of the receiving mechanism. The signal appearing on line 51 from line start indicator operates the random number generator to supply its then randomly selected output number on lines 17 to the initializing input of pseudo halftone generator 40. Clock 52 supplies a pulse on line 24 for each print position of printer 46. Synchronism between clock 52 and the printer 46 is obtained by virtue of either feedback from the printer on line 53, or feedforward from the clock 52 to drive the operation of printer 46 via line 54. The clock 52 is arranged to provide appropriate signals on line 56 to drive buffer 54 in accordance with the relative periodicity or frequency of gray scale inputs relative to the printing rate of printer 46. For example, the clock signals supplied on line 56 may be one-half or may be one-fourth the frequency of those supplied on line 24 to represent that the gray scale levels change once every two print positions of printer 46. Except for the pseudo halftone generator 40 described in FIG. 1, all the elements of FIG. 4 are individually well known in the art and need not be described in detail here.

In operation, scanner 41 and quantizer 42 or computer system 43 deliver gray scale data, via switch 44, to buffer 45. Upon line start indicator 47 of printer 46 indicating the start of a line by means of a signal on line 48, buffer 45 delivers gray scale data on lines 11 under the control of clock signal appearing on line 56. The line start indicator signal appearing on line 51 also operates random number generator 50 to initialize the pseudo halftone generator by signals on line 17. The pseudo halftone generator 40 responds by comparing the initial count to the gray scale level and supplying the pseudo halftone output on line 16 in serial form, advancing the count supplied to comparator 10 in accordance with the pulses supplied on line 24 from clock 52.

Figure 5:
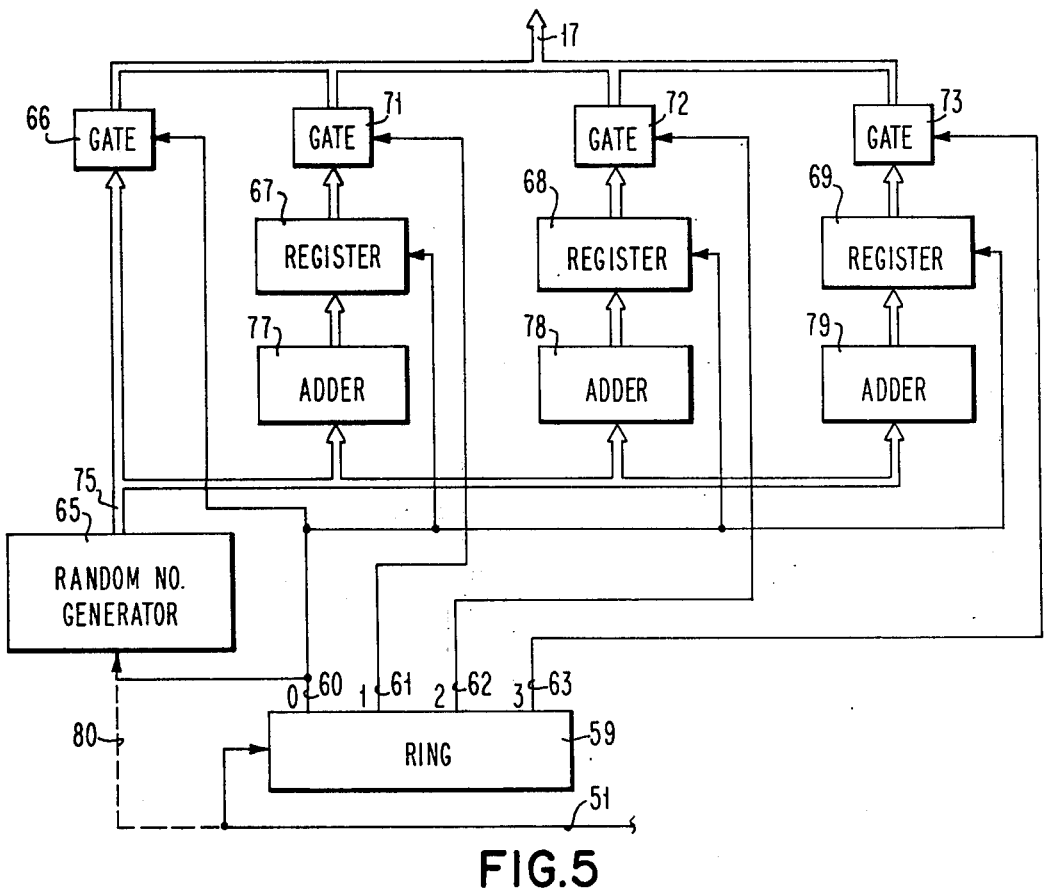
FIG. 5 is a block diagram of alternative initialization circuitry for the system of FIG. 4.

The arrangement of FIG. 5 comprises an alternative to the random number generator 50 in FIG. 4. With reference to FIG. 2A, use of the random number generator 50 will result in random starting points for each of the lines 30 through 33 rather than the uniform matrix pattern shown in the figure. This means that each print line will begin with any randomly selected number from 0 to 15.

To implement a pre-formatted matrix, the apparatus of FIG. 5 is required. There, the line start indicator signal on line 51 is supplied to the input of a ring or four phase clock circuit 59. Line 60 of ring 59 is connected to random number generator 65, to gate circuit 66, and to the "load" inputs of registers 67 through 69. Lines 61 through 63 are connected, respectively, to gate circuits 71 through 73. Random number generator 65 is the same as random number generator 50 in FIG. 4 except that the lowest order stages of the counter are preset and the noise excitation is applied to the binary 4 (N) stage. Thus, the random number generator 65 randomly selects from values 0, 4, 8 or 12. The generator 65 is connected via lines 75 to gate circuit 66 and to adders 77 through 79. Gate circuits 66 and 71–73 are connected to lines 17 of FIGS. 4 and 1.

In operation, assume that ring 59 is in the last state, number 3. A subsequent line start indicator signal on line 51 operates the ring to the "zero" state, providing a similar pulse signal on line 60. This signal operates the random number generator 65 to provide a randomly selected number on lines 75. As an example, the numbers which may be randomly selected may be 0, 4, 8 or 12 employed in line 30 of FIG. 2A as discussed above. The randomly selected number is supplied to gate circuit 66, and adders 77 through 79. Each adder adds a different predetermined value to the randomly selected number and supplies the resultant output, respectively, to registers 67 through 69. To accomplish the matrix shown in FIG. 2A, adder 77 must add the value of 11 to the randomly selected muber on line 75 without a carry. This means that any total of binary 16 or greater will appear as a value of O or greater. For example, should the selected number on line 75 be 8, the total from adder 77 with a carry would be a binary 19, but appears as an output of binary 3 without the carry. Similarly, adder 78 adds a value of 1 to the same randomly selected number on line 75 and adder 79 adds a value of 10 to the same randomly selected number. The signal on line 60 operates gate 66 to transmit the randomly selected number to lines 17 to thereby initialize the pseudo halftone generator 40. The signal on line 60 also operates the load inputs of registers 67 through 69 to load therein the outputs of the respective adders 77–79. At the next line start indicator signal on line 51, the ring advances to the 1 state, providing an output signal on line 61. This signal operates gate circuit 71 to transmit the total appearing in register 67 to lines 17 of the pseudo halftone generator 40, thereby initializing the generator for print line 31 in FIG. 2A. The next line start indicator signal on line 51 operates the ring 59 to state 2 to provide an output signal on line 62. This signal operates gate 72 to transmit the total from register 68 to the initialize lines 17 of the halftone generator 40. This causes the halftone generator 40 to produce the print line 32 of FIG. 2A. Lastly, the next line start indicator signal on line 51 operates the ring to condition 3 to provide an output signal on line 63. This signal operates gate circuit 73 to provide the total from register 69 to the initialize input lines 17 of the halftone generator 40. The halftone generator then produces the print line 33 shown in FIG. 2A. The next line start indicator signal on line 51 again operates the ring to state 0 to cause the generation of another randomly selected number. As an alternative, registers 67 through 69 may be eliminated and line 80 employed to connect line 51 directly to the random number generator 65. This causes selection of one of the random numbers in line 30 of FIG. 2A for each line start indicator signal on line 51. Operation with the registers 67 through 69 and without line 80 causes the generation of a regular matrix pattern selected to avoid Moire patterns as much as possible as shown in FIG. 2A. Operation of the system with line 80 and without registers 67–69 allows considerable snifting of the print lines 31 through 33 individually with respect to print line 30. This may result in a more random relative location of the dot pattern such as shown in FIG. 3A which, if truly random, results in a similar or slightly better avoidance of Moire patterns. However, should operation of the random number generator assume a more regular pattern due to noise perturbations in the total machine system, it is conceivable that the dot patterns might possibly align themselves in some fashion, resulting in more pronounced Moire patterns.

The matrix shown in FIG. 2A is repeated in FIG. 6A. Employing the apparatus of FIGS. 4 and 5, random number generator 65 may cause initialization of the pseudo halftone generator 40 such that any of the equivalent matrices of FIGS. 6B through 6D are produced for any given series of lines. The matrix of FIG. 2A is also repeated at FIG. 7A. This illustrates that random number generator 65 and adders 77 through 79 may be recast to vary the row organization of the matrix and still produce a totally equivalent matrix. By "equivalent" is meant that the matrices will give the same shape of dot pattern throughout an area of uniform gray scale level and will differ one from the other only at boundaries between different gray scale levels.

Figures 6, 7, 8:
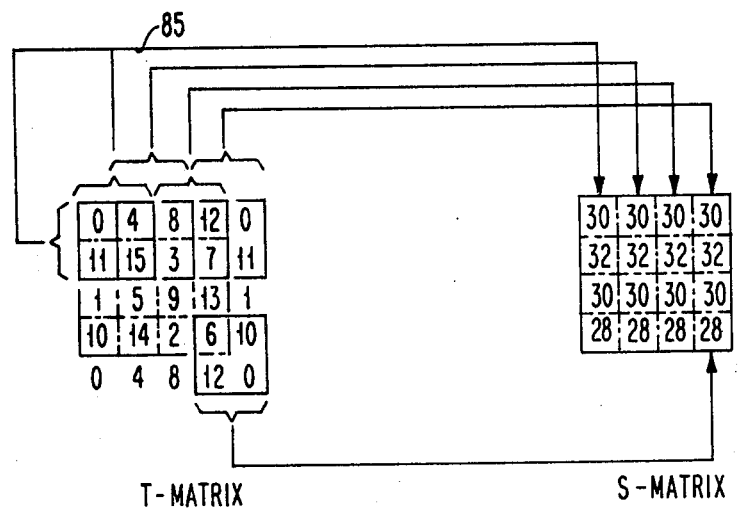
FIG. 6 is a diagrammatic representation of a series of gray scale matrices.
FIG. 7 is a diagrammatic representation of another series of gray scale matrices.
FIG. 8 is a diagrammatic representation of a gray scale matrix and its corresponding weight distribution matrix.

FIG. 8 illustrates the weight distribution of the matrix of FIG. 2A. The gray scale matrix of FIG. 2A is shown as the T-matrix and the corresponding weight distribution is shown as the S-matrix. The S-matrix is a matrix of the sums of each corresponding T-matrix position with the adjacent right and lower T-matrix positions. Thus, line 85 represents the sums of the gray scale level matrix count value positions 0, 4, 11 and 15 which comprise a total of 30.

Figures 9, 10:
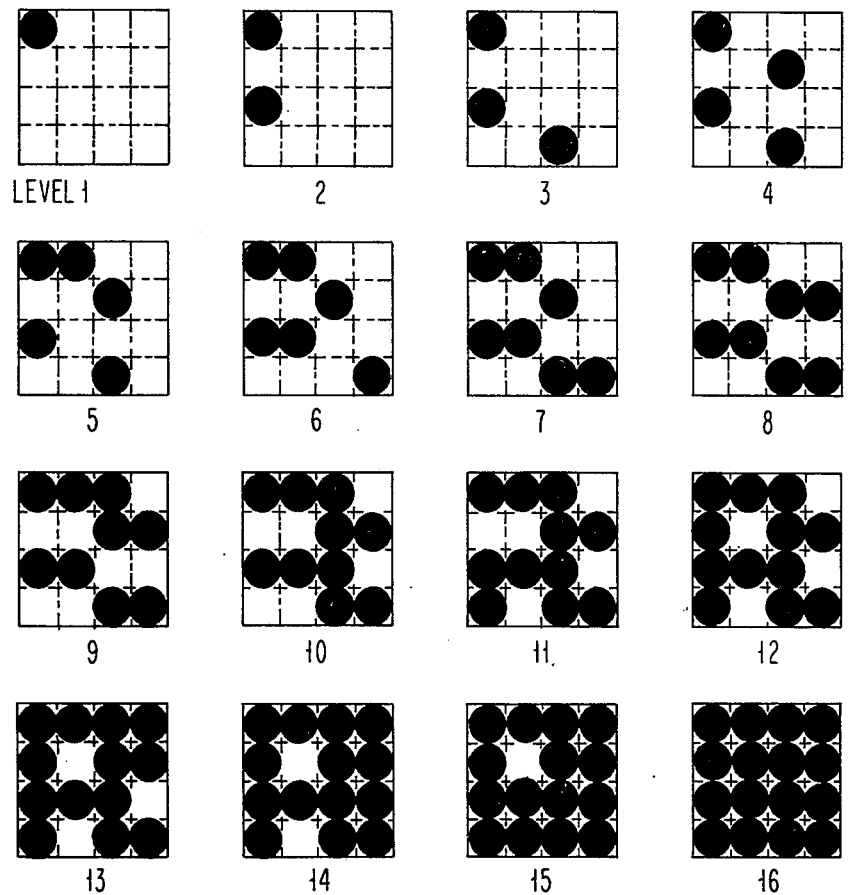
FIG. 9 is a diagrammatic representation of a gray scale matrix and its corresponding dot pattern.
FIG. 10 is a diagrammatic representation of an exemplary gray scale matrix showing the low count value print position in each line.

FIG. 9 illustrates the gray scale matrix of FIG. 2A and the corresponding dot patterns for all gray scale levels greater than zero. As may be visualized with reference to FIG. 9, the important properties of the (4×4) pseudo halftone matrix are: (a) the elements of the matrix in each row can be generated in a cyclic fastion; (b) when the output copy is rescanned by a (2×2) size aperture, the dot patterns remain invariant; and (c) the elements in the matrix, which represent different intensity levels, are uniformaly distributed. For printing with matrices other than (4×4), properties (a) and (c) can be nearly preserved and property (b) cannot be preserved.

The design of the cyclic code pseudo halftone matrix can be broken into two parts: (1) choosing the order by row of the print lines of the matrix and (2) assigning the initial value of the cyclic sequence in each row to a suitable column in the matrix. Thus, given a (N×N) cyclic code matrix, there will be N rows of cyclic elements. Let $G_N$ be an N Vector whose elements contain the initial values of the cyclic sequence, i.e. $G_N(.)$ is taken from 0, 1, 2, . . . (N−1). Then, let $T_G$ be the corresponding pseudo halftone printing matrix formed from expanding the initial values given in G into rows of cyclic sequences. Hence, for a given $G_N$, there are many ways to form $T_G$, because there are many ways to choose the starting columns for the initial values of the cyclic sequences in all the rows. A way of avoiding Moire patterns is to attempt to equalize the sums of any two adjacent rows. Thus, for any given N, $G_N$ can be chosen as follows:

$$G_n = \begin{vmatrix} 0 \\ (N-1) \\ 1 \\ (N-3) \\ 3 \\ \cdot \\ \cdot \\ \cdot \\ \cdot \\ 4 \\ (N-4) \\ 2 \\ (N-2) \end{vmatrix}$$

Since the average value from 0 to (N−1) is (N−1)/2, the choice of $G_N$ above ensures that the sum of any two rows of elements in $T_G$ will have "approximately" equal values. In other words, $T_G$ formed by expanding $G_N$ defined above minimizes the maximum difference between the sums of two adjacent rows of elements in $T_G$. Note that the sum of the elements in each row in $T_G$ is equal to $$x_o N + \sum_{k=o}^{N-1} k \cdot_N$$

where $x_o$ is the initial value of the cyclic sequence. Hence, for a given N, the sum of the elements in each row is governed by the initial value $x_o$. The arrangement of the elements in $G_N$ would then completely define the sum of the elements in each row of $T_G$. It should be noted that, as far as minimizing the maximum difference between the sums of two rows of elements in $T_G$ is concerned, $G_N$ above is not unique and $G_N$ defined in the following would give the same result:

$$G_N = \begin{vmatrix} 0 \\ (N-2) \\ 2 \\ (N-4) \\ 4 \\ \cdot \\ \cdot \\ \cdot \\ \cdot \\ 3 \\ (N-3) \\ 1 \\ (N-1) \end{vmatrix}$$

For a chosen $G_N$, it is then necessary to find the column for starting the initial or low value of the cyclic sequence of each row to form the resultant matrix $T_G$. A natural suggestion is that the starting value should be separated approximately equidistant to each other in the printing matrix by approximately the $\sqrt{N}$ distance apart, and if $\sqrt{N}$ is not an integer, using the next higher integer value. However, as illustrated in FIG. 10, a repeated shift of the same amount of the initial values of the cyclic sequence in the larger matrices could create a low frequecny line pattern. The example illustrated in FIG. 10 is a (9×9) matrix, wherein shifting the initial values of the cyclic elements in each row by 3 results in a very apparent low frequency line pattern and, possibly, in a visually recognizable Morie pattern.

Figure 11:
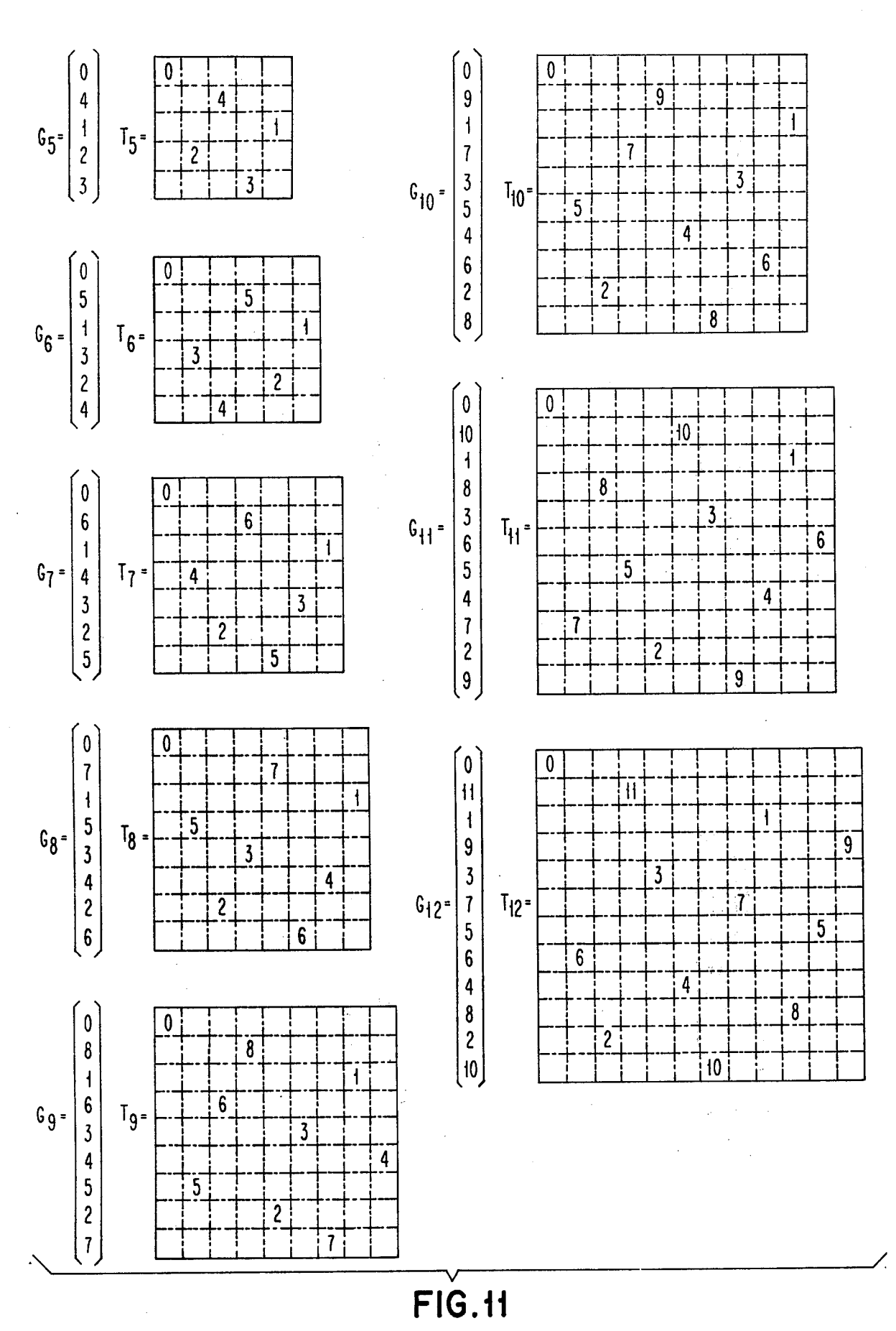

Thus, in order to avoid the line pattern effect, the low values for the print lines from one row to the next are shifted by integer ($\sqrt{N}$) and alternate print lines by the integer ($\sqrt{N}\pm1$) columns. FIG. 11 illustrates exemplary cyclic code pseudo halftone printing matrices from a (5×5) matrix to a (12×12) matrix. Only the lowest or initial values of the cyclic sequences in the rows are shown. The other elements in each row can be obtained by adding N to its preceding element in a cyclic fashion.

Figure 12:
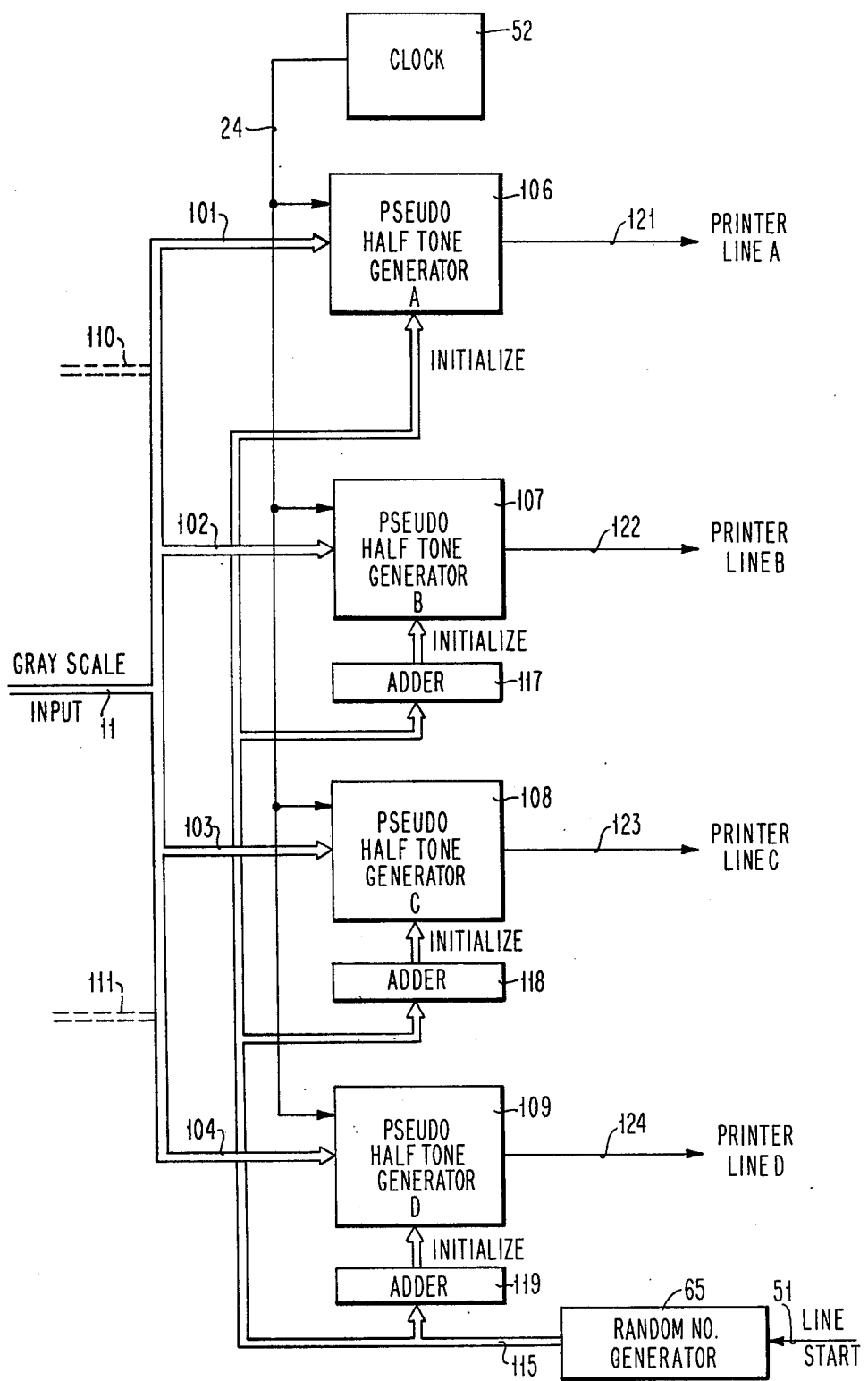
FIG. 12 is a schematic block diagram of a series of pseudo halftone generators arranged in parallel in accordance with the invention.

FIG. 12 illustrates the parallel arrangement of pseudo halftone generators for printing all of the print lines in a single matrix simultaneously. Assuming that the supplied gray scale data is of a (4×4) matrix, the same gray scale input on line 11 is supplied to inputs 101 through 104 of pseudo halftone generators 106 through 109. If the gray scale data were of a (2×2) matrix, then one set of gray scale data would be supplied on lines 110 to inputs 101 and 102 of pseudo halftone generators 106 and 107, while another set of gray scale data would be supplied on lines 111 to inputs 103 and 104 of pseudo halftone generators 108 and 107.

Clock 52 is connected to each of the pseudo halftone generators by line 24, which is synchronized with the printing mechanism 46 as shown in FIG. 4. Line 51 from the line start indicator of the printer is connected to random number generator 65 to cause the generator to supply its then randomly selected number on output lines 115. The lines 115 are connected to the initialized input of halftone generator 106 and to adders 117, 118 and 119. Pseudo halftone generators 106 through 109 are identical to pseudo halftone generator 40 in FIG. 4 and as detailed in Fig. 1. Adders 117, 118 and 119 and each identical to the corresponding adders 77, 78 and 79 in FIG. 5. The pseudo halftone generators supply their individual serial outputs on lines 121 through 124 to the respective parallel print lines of printer 46.

In operation, a line start signal on line 51 operates the random number generator 65 to supply the selected number from those on matrix print line 30 in 2A onto lines 115. The number represented by the signals on lines 115 are supplied to initialize pseudo halftone generator 106 and are supplies to adders 117, 118 and 119. The adders each respectively add a predetermined value without carry to the selected number as illustrated respectively at lines 31 through 33 in FIG. 2A and supply the total to initialize the pseudo halftone generators 107, 108 and 109. A clock signal may operate a buffer such as buffer 45 to supply gray scale data on lines 11 to inputs 101 through 104 of the pseudo halftone generators 106 through 109. The pseudo halftone generators then operate in response to the gray scale data to supply or not supply print signals on the respective output lines 121 through 124. At the next clock signal on line 24 from clock 52, the pseudo half tone generators are each incremented without carry and compare the new count value to the applied gray scale level, once again supplying a print or not print signal on the respective outline lines 121 through 124. The incrementing and suitable application of gray scale inputs continues until the end of the print line and start of the subsequent print line, at which time a line start signal is supplied on line 51.

The repetition rate of the supply of gray scale data on line 11 as controlled by the clock signals on line 56 is related to the incrementing rate of the count values as controlled by the clock signals on line 56 by the number of print positions along the print line represented by a single gray scale level. Thus, where an entire (N×N) matrix area is represented by a single gray scale level, the ratio of the repetition rate to the incrementing rate is 1/N Further, where only a (n×n) sub-matrix of the print matrix (N×N) is represented by a single gray scale level, the ratio of repetition rate to the incrementing rate is n/N.

While the invention has been particularly shown and described wih reference to preferred embodiments thereof, it will be understood by those skilled in the art that the foregoing and other changes in form and details may be made therein without departing from the spirit and scope of the invention.

What is claimed is:

1. Apparatus for generation of pseudo halftone spot patterns for series of print positions, each series forming a print line, for adjacent groups of N said print lines to form (N×N) matrices of print positions, said spot patterns being generated in accordance with pre-established gray scale levels, each of said gray scale levels representing an area greater than one print position, comprising:

an input means including means for supplying said pre-established gray scale levels in digital form sequentially at a repetition rate lower than the incrementing rate of the counting means;
   an output;
   counting means for incrementing a count by a preselected number N for each print position, said counting means recycling when the count exceeds the square of said number minus 1;
   initialization means for initializing the count of said counting means at the beginning of each said print line, said initialization means including a random number generator for selecting said initialization count in digtital form for one of said N print lines and for separately supplying said selected initialization count for each of the remainder of said N print lines, each differing from said selected count by a different predetermined value; and comparator means connected to said input means and to said counting means for comparing said gray scale level to said count for each said print position and providing a print signal therefor at said output upon said level exceeding said count.

2. The apparatus of claim 1:
wherein said output is connected to a printing means;
wherein said input means includes a buffer;
wherein said initialization means is connected to said printing means to receive therefrom signals indicating the beginning of each said print line; and
additionally including clock means connected to and synchronized with said printing means for supplying first and second clock signals at different rates, connected to said counting means for supplying said first clock signals at said incrementing rate to increment said counting means, and connected to said buffer for supplying said second clock signals to drive said buffer to supply said gray scale levels at said repetition rate.

3. The apparatus of claim 1 wherein said initialization means additionally includes N−1 separate adder means for altering said selected initialization count for each of said remaining print lines.

4. The apparatus of claim 1 wherein:
said pre-established gray scale levels ranging in value from 0 to $N^2$ 5. The apparatus of claim 4 wherein said predetermined gray scale levels are uniform over each said matrix.

6. The apparatus of claim 1 including in parallel, a separate output, counting means, and comparator means for each of said N print lines.

7. The apparatus of claim 6:
wherein said outputs are connected to a printing means;
wherein said input means includes a buffer;
wherein said initialization means is connected to said printing means to receive therefrom signals indicating the beginning of said print lines; and
additionally including clock means connected to and synchronized with said printing means for supplying first and second clock signals at different rates, connected to all said counting means for supplying said first clock signals at said incrementing rate to increment said counting means, and connected to said buffer for supplying said second clock signals to drive said buffer to supply said gray scale levels at said repetition rate.

8. The apparatus of claim 7 wherein:
said pre-established gray scale levels ranging in value from 0 to $N^2$ and each represent and area equal to one said matrix;
and
said clock means includes means for supplying said second clock signals at a repetition rate related to said rate of said first clock signas by the factor of 1/N.

9. The apparatus of claim 7 wherein:
said pre-established gray scale levels ranging in value from 0 to $N^2$ and each represent an area equal to an ($n \times n$) submatrix of said matrix;
and
said clock means includes means for supplying said second clock signals at a repetition rate related to said rate of said first clock signals by the factor of n/N.

10. A method of generation of pseudo halftone spot patterns along a print line of of print positions for an adjacent group of N said print lines to form (N×N) matrices of print positions in accordance with pre-established gray scale levels ranging in value from 0 to $N^2$ , comprising the steps of:

initializing a count for the print position at the beginning of said print line, said initialization step comprising selecting said initialization count in digital form for one of said N print lines, and separately supplying initialization counts for each of the remainder of said N print lines, each differing from said selected count by a different predetermined value;

supplying said pre-established gray scale level in digital form for said print position;

comparing said gray scale level to said count for said print position;

signalling the printing of said print position upon said comparing step indicating said level is greater than said count;

incrementing said count by a preselected number N, recycling when the count exceeds the square of said number minus 1, for the next sequential print position of said print lie; and returning to said supplying step.

11. The method of claim 10 for providing print signals to an output means which signals the beginning of each said print line for generation of said pseudo halftone spot patterns wherein:

said supplying step comprises supplying preselected gray scale levels which each represent an area greater than that of one of said print positions;

said initialization step additionally comprises initialization responsive to each said beginning of print line signal;

said supplying step additionally comprises supplying said pre-established gray scale levels sequentially at a repetition rate lower than the incrementing rate of said incrementing step; and said signalling step additionally comprises signalling said output means.

12. The method of claim 10 for the parallel generation of said pseudo halftone spot patterns for said adjacent group of N print lines wherein:

said initialization step additionally comprises simultaneously and separately initializing each of said N print lines; and said supplying, comparing, signalling and incrementing steps are accomplished essentially in parallel for each of said N print lines.

13. The method of claim 10 wherein said supplying step comprises supplying pre-established gray scale levels which each represent an area equal to one said matrix; and said supplying step additionally comprises supplying said pre-established gray scale levels in digital form at a repetition rate synchronized with and related to the incrementing rate of said incrementing step by the factor of 1/N.

14. The method of claim 10 wherein said supplying step comprises supplying pre-established gray scale levels which each represent an area equal to an (×n) submatrix of said matrix; and said supplying step additionally comprises supplying said pre-established gray scale levels for said submatrices in digital form at a repetition rate synchronized with and related to the incrementing rate of said incrementing step by the factor of n/N.

* * * * *

UNITED STATES PATENT AND TRADEMARK OFFICE
CERTIFICATE OF CORRECTION

PATENT NO. : 4,032,978
DATED : June 28, 1977
INVENTOR(S) : KWAN Y. WONG

It is certified that error appears in the above-identified patent and that said Letters Patent are hereby corrected as shown below:

Col. 11, line 60, the word "signas" should read --signals--;

Col. 12, line 61, the expression "(xn)" should read --(nxn)--.

Signed and Sealed this

Thirty-first Day of January 1978

[SEAL]

Attest:

RUTH C. MASON
Attesting Officer

LUTRELLE F. PARKER
Acting Commissioner of Patents and Trademarks